(12) United States Patent
Heber et al.

(10) Patent No.: US 6,880,545 B2
(45) Date of Patent: Apr. 19, 2005

(54) DUAL CONVEYOR JET IMPINGEMENT OVEN

(75) Inventors: Albert J. Heber, Delphi, IN (US); Laxminarasimhan Vasan, San Dimas, CA (US); James T. Cole, Algonquin, IL (US)

(73) Assignee: Gas Research Institute, Des Plaines, IL (US)

( * ) Notice: Subject to any disclaimer, the term of this patent is extended or adjusted under 35 U.S.C. 154(b) by 0 days.

(21) Appl. No.: 10/650,422

(22) Filed: Aug. 28, 2003

(65) Prior Publication Data

US 2005/0045173 A1 Mar. 3, 2005

(51) Int. Cl.[7] .............................. A21B 1/00; F24C 15/32
(52) U.S. Cl. ................ 126/21 A; 126/21 R; 99/443 C; 219/400; 34/212; 34/216
(58) Field of Search .......... 126/21 R, 21 A; 99/443 C, 99/443 R; 219/400; 432/176, 194, 199, 159; 34/223, 34/216, 231, 217, 202, 207, 208

(56) References Cited

U.S. PATENT DOCUMENTS

| | | | |
|---|---|---|---|
| 4,753,215 A | * | 6/1988 | Kaminski et al. ......... 126/21 A |
| 4,757,800 A | * | 7/1988 | Shei et al. ................ 126/21 A |
| 5,131,841 A | * | 7/1992 | Smith et al. .................. 432/59 |
| 5,423,248 A | | 6/1995 | Smith et al. |
| 5,584,237 A | | 12/1996 | Moshonas |
| 5,832,812 A | | 11/1998 | Wolfe et al. |
| 6,192,877 B1 | | 2/2001 | Moshonas et al. |
| 6,526,961 B1 | * | 3/2003 | Hardenburger .......... 126/21 A |
| 6,539,934 B1 | | 4/2003 | Moshonas et al. |
| 6,592,364 B1 | | 7/2003 | Zapata et al. |

* cited by examiner

Primary Examiner—James C. Young
(74) Attorney, Agent, or Firm—Mark E. Fejer

(57) ABSTRACT

A dual conveyor jet impingement oven having a blower box with at least one air inlet opening and at least two air outlet openings and a heating space adjacent to and in fluid communication with the blower box. Disposed within the heating space are two spaced apart pairs of spaced apart heated air distribution plenums, which form a central return air conduit therebetween. The central return air conduit has a return air outlet end in fluid communication with the blower box and the spaced apart heated air distribution plenums have a heated air inlet opening in fluid communication with the at least two air outlet openings. A horizontal heating surface is disposed between each pair of spaced apart heated air distribution plenums, each of which has a perforated heated air distribution plate facing the horizontal heating surface.

32 Claims, 7 Drawing Sheets

DUAL CONVEYOR JET IMPINGEMENT OVEN

BACKGROUND OF THE INVENTION

1. Field of the Invention

This invention relates to ovens for cooking foods, in particular commercial conveyor ovens typically employed in baking foods, such as pizzas and the like. It will, however, be apparent to those skilled in the art that such conveyor ovens are suitable for use in a variety of non-food related applications, and commercial conveyor ovens for non-food related applications are deemed to be within the scope of this invention.

2. Description of Related Art

Impingement ovens are primarily employed in fast food restaurants for rapid cooking of foods such as pizzas, pre-cooked meals, cookies and the like. Such ovens employ heated air streams which impinge directly upon the surface of the food being cooked. Such ovens typically employ an air handling system, which is responsible for the supply and distribution of heated air to the food and a heating chamber or space in which the food is actually cooked. The food is typically transported into and through the heating space by one or more conveyors. To provide for rapid heating, heated air streams are provided to the heating chamber in such a manner whereby the air streams impinge directly on both the top and bottom of the device carrying the food, typically by heated air plenums, disposed above and below the conveyor, having perforated heated air distribution plates through which the heated air is directed onto the food surfaces. Conveyor/impingement ovens typical of the current state of the art are taught by U.S. Pat. No. 5,832,812 to Wolfe et al., U.S. Pat. No. 5,423,248 to Smith et al., U.S. Pat. No. 6,539,934 B2 to Moshonas et al., U.S. Pat. No. 6,592,364 B2 to Zapata et al., and U.S. Pat. No. 6,526,961 B1 to Hardenburger.

A major problem associated with conveyor ovens is the exchange of internal hot air with room air due to losses from the conveyor tunnel/heating space. A further problem is the low speed of baking certain foods due to low heat transfer. Yet a further problem is the limited kitchen space available in fast food restaurants for conveyor ovens capable of meeting the peak demands of their customers.

SUMMARY OF THE INVENTION

Accordingly, it is one object of this invention to provide an impingement heating apparatus which reduces heat losses occurring as the result of the exchange of heated air from within the heating space or chamber with room air compared to conventional conveyor ovens.

It is another object of this invention to provide an impingement heating apparatus which provides higher heat transfer rates over conventional impingement heating equipment, thereby increasing the speed at which the foods can be cooked.

It is yet a further object of this invention to provide an impingement heating apparatus which provides for more uniform heating and greater efficiency than conventional ovens so as to increase the food output per unit of kitchen space occupied by the apparatus.

These and other objects of this invention are addressed by a heating apparatus comprising at least one wall enclosing a blower box and forming at least one air inlet opening and at least two air outlet openings and at least one heating section wall defining a heating space adjacent to and in fluid communication with the blower box. Two spaced apart pairs of spaced apart heated air distribution plenums are disposed within the heating space and form a return air conduit therebetween, which return air conduit has a return outlet end in fluid communication with the at least one air inlet opening of the blower box. Each of the spaced apart heated air distribution plenums includes a heated air inlet opening in fluid communication with the at least two air outlet openings. A horizontal heating surface is disposed between each pair of spaced apart heated air distribution plenums and each of the heated air distribution plenums comprises a substantially horizontally disposed, perforated heated air distribution plate facing the horizontal heating surface. The horizontal heating surface is typically a porous conveyor for conveying items to be heated, such as food, whereby the heated air streams ejected from the lower of the spaced apart heated air distribution plenums directly impinge onto the bottom surface thereof. Incorporated into the heated air distribution plates is a novel jet nozzle design whereby the air streams ejected from the heated air distribution plenums vertically impinge upon the food surface and porous conveyor, which design reduces the exchange of internal heated air with room air, thereby increasing oven uniformity and efficiency.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
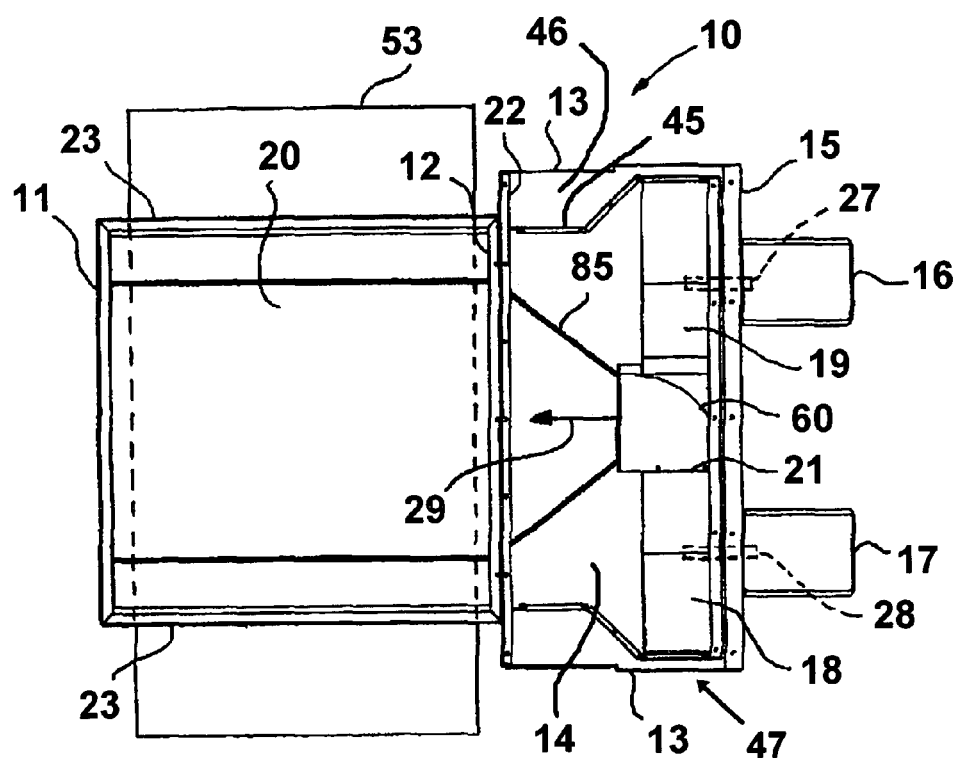
FIG. 1 is a schematic diagram showing a simplified plan view of a dual conveyor oven in accordance with one embodiment of this invention.

As shown in FIG. 1, dual conveyor oven 10 comprises a blower box 47 defined by a blower box back wall 15, blower box sidewalls 13 and blower box front wall 22 disposed opposite blower box back wall 15. Disposed within blower box 47 is air plenum 14 having plenum sidewalls 45. Disposed between plenum sidewalls 45 and blower box sidewalls 13 is an insulating material 46. Disposed adjacent to air plenum 14 is a heating space defined by front wall 11, oppositely disposed back wall 12 and side walls 23. Although shown as separate walls, back wall 12 of the heating space and blower box front wall 22 may be formed as a single wall, common to both the heating space and blower box 47. Disposed within air plenum 14 are two blowers 18 and 19, each of which comprises a motor, 17 and 16, respectively, external to air plenum 14. Each motor 16, 17 comprises a drive shaft 27, 28 which is oriented parallel to the direction of air flow from air plenum 14 into the heating space as indicated by arrow 29. Each blower 18, 19 has a blower outlet 21 in fluid communication with heated air distribution system 20 disposed within the heating space.

To achieve the static pressure required to move sufficient airflow through the oven, it is important that the blower diameter be as large as possible. This is achieved by the diagonal positioning of the blowers within air plenum 14. However, one problem encountered with ovens of this design is the left to right (or right to left) variation in airflow caused by the left to right (or left to right) momentum created by the blowers. This causes left to right (or right to left) asymmetry of air velocities within the heating space. This problem is addressed in accordance with one embodiment of this invention by modification of the transitioning conduit between the blower outlets and the heated air distribution plenums as described herein below.

Figure 5:
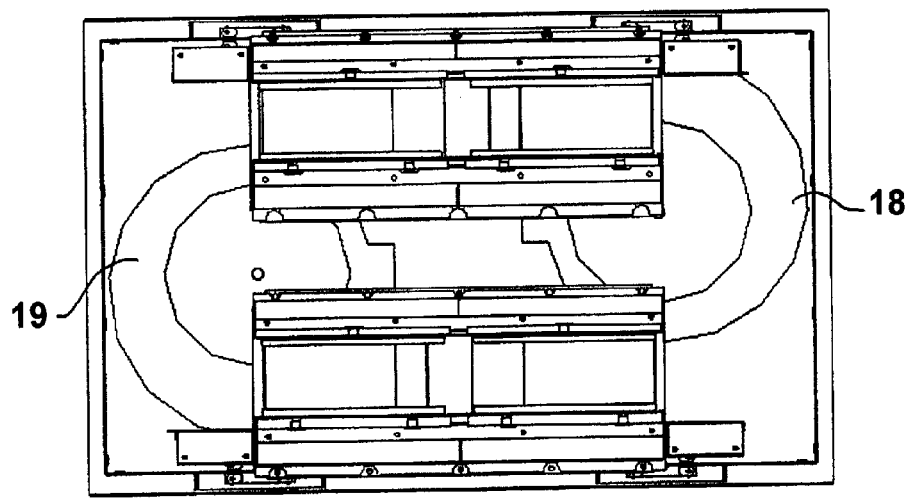
FIG. 5 is a view of the dual conveyor oven shown in FIG. 2 taken along the line V—V.
Figure 6:
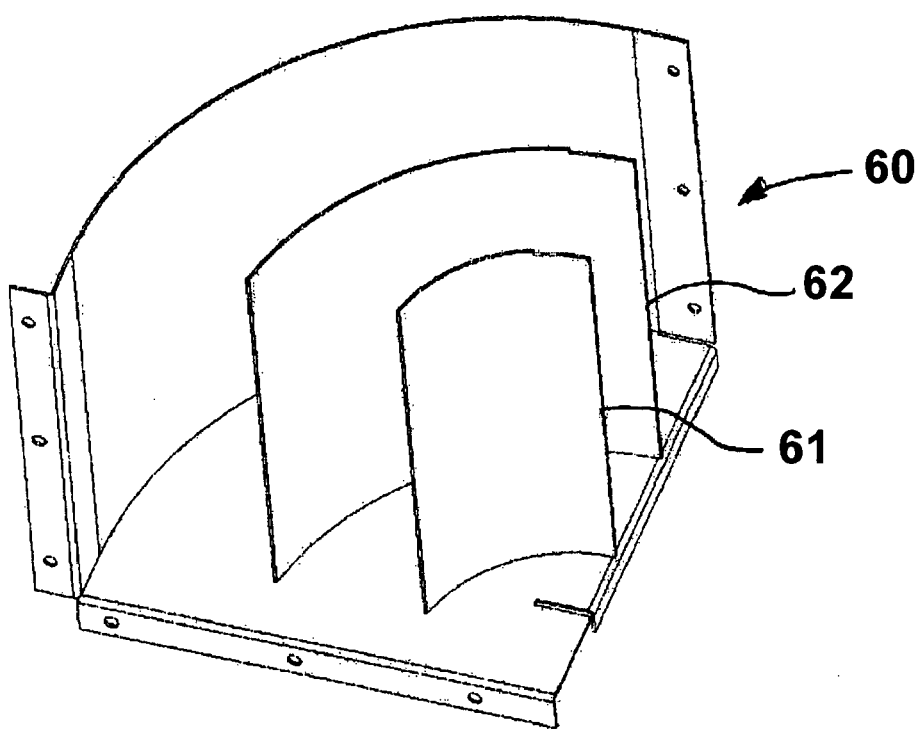
FIG. 6 is a diagram showing turning vanes for directing air flow from an air supply blower output into a dual conveyor oven in accordance with one embodiment of this invention.

Connected to blower outlet 21 of each of blowers 18, 19 is a 90° elbow transition section or conduit 60, only one of which is shown in FIG. 1 for the sake of clarity, which 90° elbow transition section provides a conduit for fluid communication between blower outlets 21 and heated air distribution system 20. Disposed within 90° elbow transition section 60 in accordance with one preferred embodiment of this invention is at least one turning vane 61, 62 shown in FIG. 6. The use of turning vanes 61, 62 in the 90° elbow transition section results in improved aerodynamics, producing reduced airflow resistance and improved, more uniform air distribution within heated air distribution system 20. As suggested by FIG. 2 and as more clearly depicted in FIG. 5, blower motors 16, 17 and blowers 18, 19 are positioned diagonally with respect to each other. Such relative positioning enables the use of larger size blowers for a given size air plenum 14 which, in turn, can produce higher amounts of heat transfer.

Figure 2:
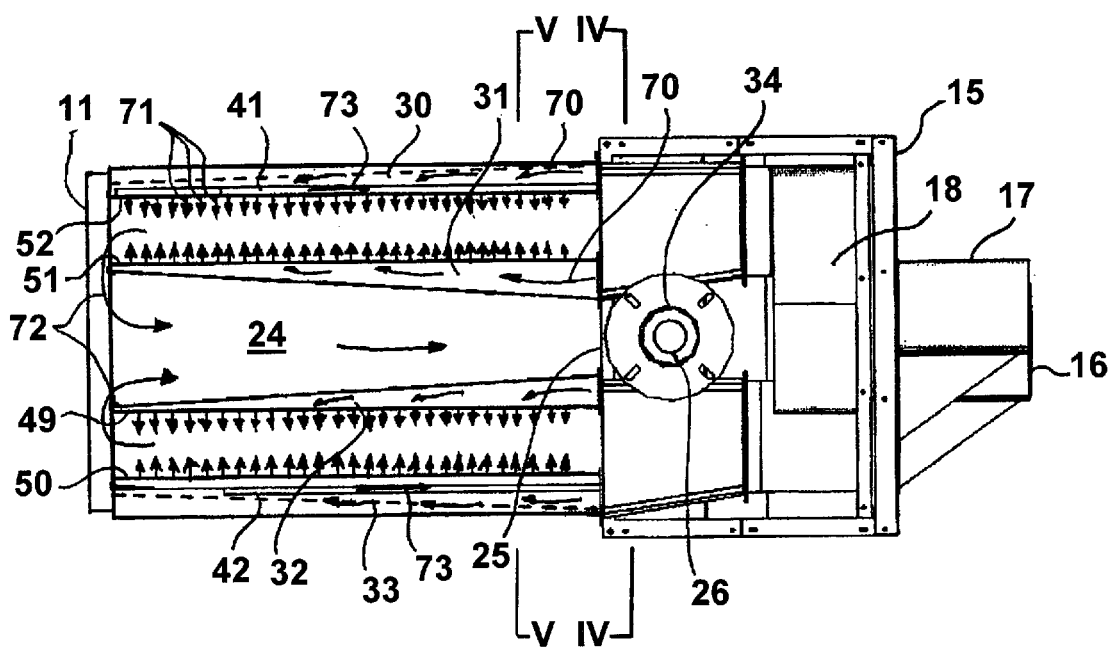
FIG. 2 is a schematic lateral view of a dual conveyor oven in accordance with one embodiment of this invention.

As shown in FIG. 2, disposed within air plenum 14 is a burner tube 34 which extends along substantially the entire distance between blower box sidewalls 13 of blower box 47 and is the heat exchange means by which heat is transferred to the air flowing into blowers 18, 19 by which it is transmitted into heated air distribution system 20. Disposed within burner tube 34 is a burner 26, typically fueled by a gaseous fuel, preferably natural gas, which produces a flame within burner tube 34, thereby providing the heat source for burner tube 34.

Figure 3:
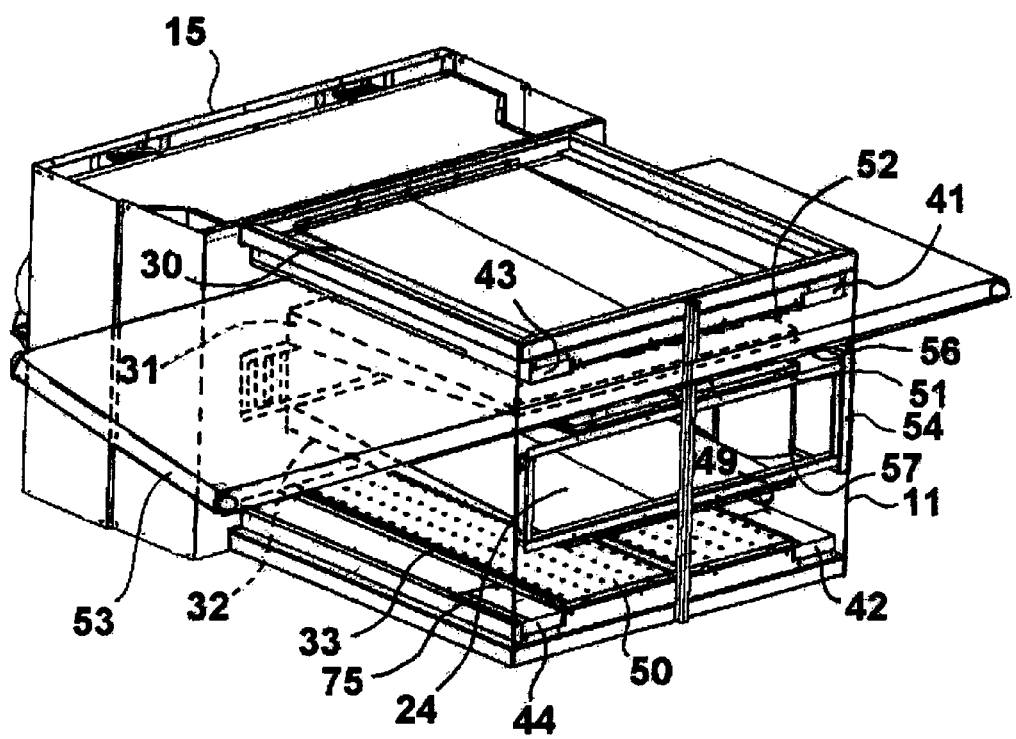
FIG. 3 is a perspective view the heating space of a dual conveyor oven in accordance with one embodiment of this invention.
Figure 4:
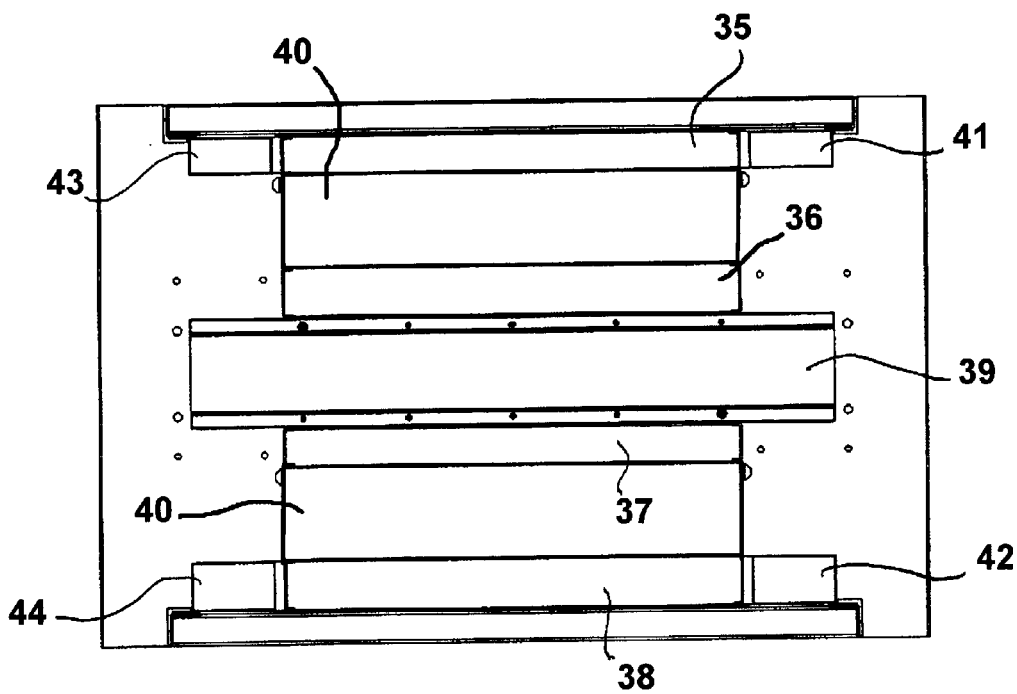
FIG. 4 is a view of the dual conveyor oven shown in FIG. 2 taken along the line IV—IV.
Figure 7:
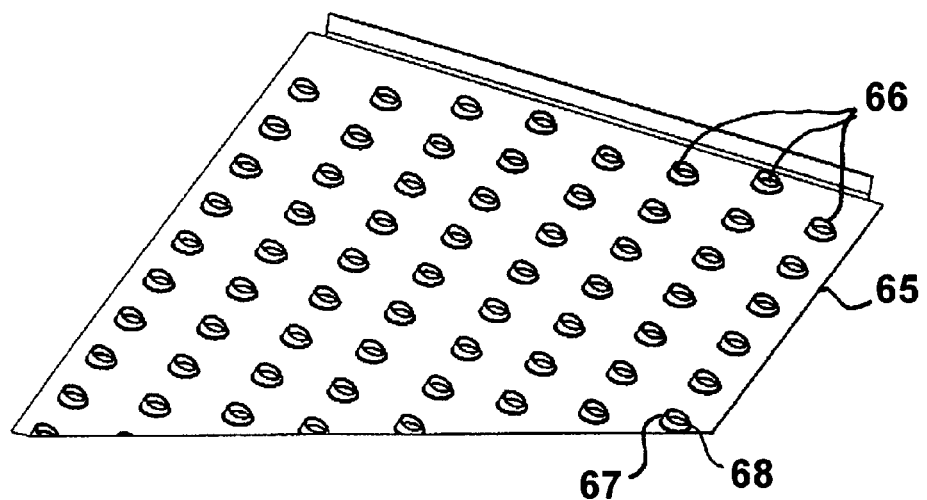
FIG. 7 is a partial perspective view of a heated air distribution plate in a dual conveyor oven in accordance with one embodiment of this invention.
Figure 8:
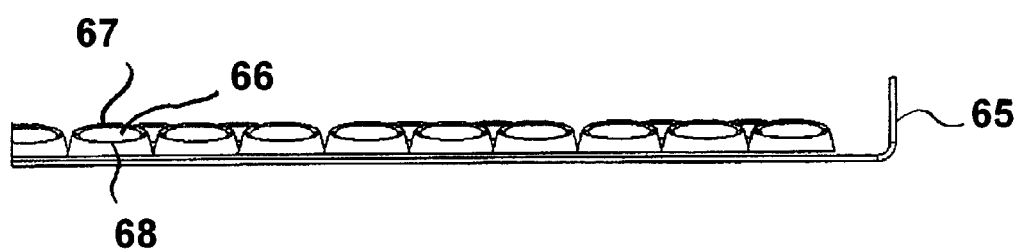
FIG. 8 is a view of a portion of a heated air distribution plate looking in the direction of flow of heated air within the heated air distribution plenum of a dual conveyor oven in accordance with one embodiment of this invention.
Figure 9:
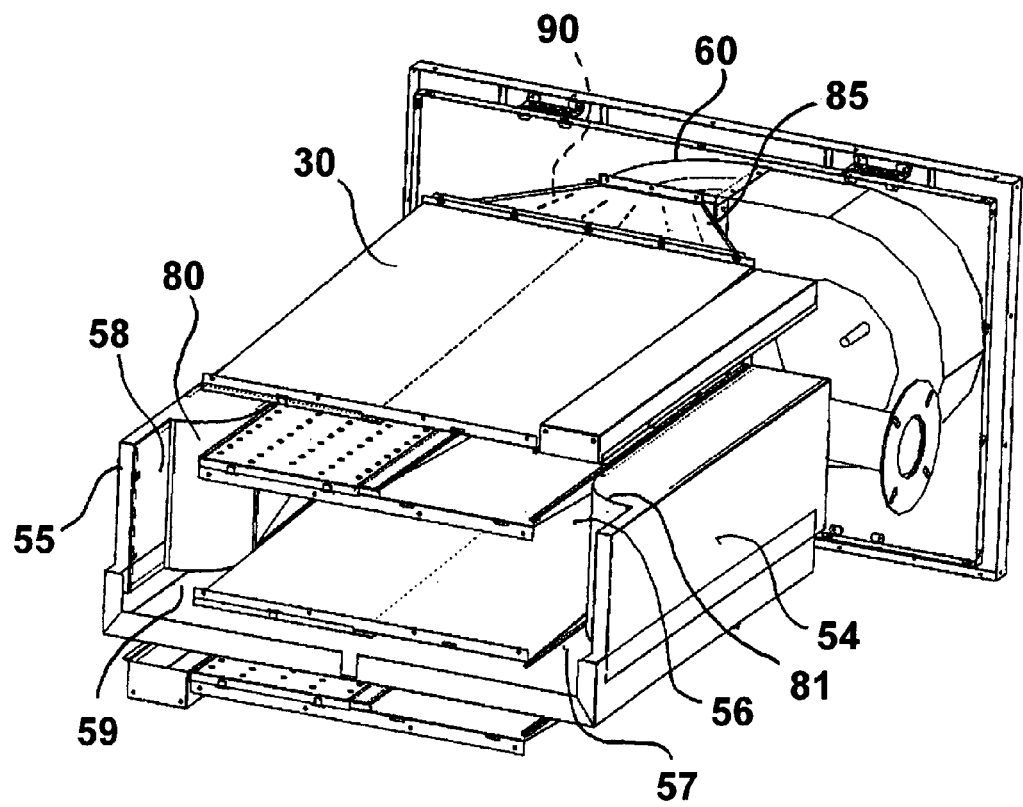
FIG. 9 is a perspective view of a portion of the interior of a dual conveyor oven in accordance with one embodiment of this invention.

Heated air distribution system 20 in accordance with one embodiment of this invention as shown in FIG. 2 comprises two spaced apart pairs of spaced apart first and second heated air distribution plenums 30, 31 and 32, 33. Between the spaced apart pairs of spaced apart heated air distribution plenums is formed a return air conduit 24 having a return air outlet 25 in fluid communication with air plenum 14, which return air conduit 24 comprises sidewalls 54, 55 extending between the two spaced apart pairs of spaced apart heated air distribution plenums 30, 31 and 32, 33, as shown in FIGS. 3 and 9. Each of the heated air distribution plenums 30, 31, 32 and 33 comprises a substantially horizontally oriented, heated air distribution plate 49, 50, 51 and 52, each of which heated air distribution plates is disposed on the side of the heated air distribution plenum facing the opposed heated air distribution plenum of the corresponding pair of spaced apart heated air distribution plenums. That is, heated air distribution plate 49 of the top lower conveyor heated air distribution plenum 32 is oriented to face heated air distribution plate 50 of the bottom lower conveyor heated air distribution plenum 33. Each heated air distribution plate 65, as shown in FIGS. 7 and 8, forms a plurality of heated air distribution openings 66 through which heated air, indicated by arrows 70, as shown in FIG. 2, introduced into heated air distribution plenums 30, 31, 32 and 33 through heated air distribution plenum inlet openings 35, 36, 37 and 38, respectively, as shown in FIG. 4, is distributed, as indicated by arrows 71, onto a food product disposed on conveyors 53 disposed between the heated air distribution plenums of each pair of spaced apart heated air distribution plenums. Disposed between the heated air distribution plenum inlet openings of each pair of openings 35, 36 and 37, 38 is a flow diverter 40 having an arcuate profile whereby heated air from blowers 18, 19 is split between the heated air distribution plenums of each spaced apart pair of heated air distribution plenums 30, 31 and 32, 33. The heated air is then returned through return air conduit 24 as indicated by arrows 72 to air plenum 14. In accordance with one preferred embodiment of this invention, each heated air distribution plenum, 30, 31, 32 and 33 is vertically tapered, with the widest portion oriented toward air plenum 14.

More particularly, return air conduit 24 conveys air from the front wall 11 of the heating space at the corners of the return air conduit 24 into air plenum 14 such that the air is diffused horizontally to the full width of air plenum 14 and the full height of the vertical distance between the spaced apart pairs of spaced apart heated air distribution plenums 30, 31 and 32, 33. The return air enters return air conduit 24 through return air inlet openings 56, 57, 58 and 59 disposed at the corners of return air conduit 24 proximate front wall 11 as shown in FIGS. 3 and 9. To reduce airflow resistance of return air into return air conduit 24, as compared to conventional systems, the ends of sidewalls 54, 55 disposed proximate front wall 11 are provided with inwardly oriented convex profiles 80, 81, as shown in FIG. 9. Hot spots in the air plenum occur if parts of the burner tube 34 are not cooled due to a lack of air velocity over those parts of the burner tube. Such hot spots create cooking non-uniformities and non-uniform aerodynamics at the blower inlets, reducing blower efficiency. The return air conduit 24, with its sidewalls serving to diffuse air to the full width of the air plenum 14, eliminates stagnant spots therein, thereby reducing poor inlet characteristics for the blowers.

The heated air returned to air plenum 14 through return air conduit 24 flows into air plenum 14 through return air opening 25 in which it blows across burner tube 34 uniformly and without obstruction such that each part of burner tube 34 is cooled with substantially the same amount of air and the air velocity is substantially uniformly distributed across the entire length of burner tube 34.

Disposed adjacent to the outer walls of the top upper heated air distribution plenum 30 and the bottom lower heated air distribution plenum 33 are secondary air return conduits 41, 42, 43 and 44, as shown in FIG. 4, having an opening 75, as shown in FIG. 3, through which a portion of the heated air from between each pair of heated air distribution plenums 30, 31 and 32, 33 is returned to air plenum 14. Secondary return air from secondary air return conduits 41, 42, 43 and 44 forms air jets upon entering air plenum 14, which impact against the blower box back wall 15, creating rotary air patterns that are superimposed on the substantially horizontal flow of return air flowing into air plenum 14 from return air conduit 24, causing the air to be blown back across burner tube 34 to be heated before entering the blower inlets. The blower inlets are disposed at approximately the same height as burner tube 34 so that undesirable inlet effects that can reduce airflow and efficiency are minimized.

In conventional conveyor ovens, large horizontal vortices are generated in the rear section of the heating space due to the forward momentum created by non-vertical air jets impinging upon the food being heated. Each air jet is angled towards the front portion of the heating space due to the "back-to-front" air velocity in the heated air distribution plenums. If the air velocity within the heated air distribution plenums and the jet air velocities are equal in magnitude, then the angle is generally about 45 degrees. Typical jet angles in conventional conveyor ovens range from about 5 degrees to about 20 degrees depending upon the distance of the air jet from the rear portion of the heating space. Because all the jets typically angle towards the front portion of the heating space, the sum of the individual jet momentums translates to a large forward-moving mass of air within the heating space. This forward moving mass of air in the heating space impacts the front wall of the heating space and moves sideways toward the sidewalls of the heating space. This results in a significant mass of hot air flowing forward diagonally near the front of the heating space into the surrounding room space. To make up for this loss of air to the room, room air enters the rear portion of the heating space and mixes with heated air in the heating space, thereby providing a cooling effect near the product being heated and reducing cooking efficiency.

One solution to this problem is to remove the forward directed component of the air jet. Ideally, the air jets should be perfectly vertical, reducing the tendency of the heated air in the heating space to flow towards the front portion of the heating space. This issue has been addressed in the past by the installation of screens, meshes and diverters inside the heated air distribution plenums, which caused significant additional reductions to airflow because of the added resistance to airflow. Thus, heretofore, airflow straightening has always been effected at a price in terms of airflow and heat transfer capacity.

We have discovered that heated air distribution plates in which the heated air distribution openings comprise offset or asymmetrical extrusions produce air jets which are substantially vertical with respect to the material being heated without any loss in airflow. The large mass of heated air lost to the room due to the forward motion of the jets in conventional conveyor ovens is, thus, eliminated. FIGS. 7 and 8 show portions of a heated air distribution plate 65 used for producing substantially vertical air jets in accordance with one embodiment of this invention. As shown, each of the openings 66 of heated air distribution plate 65, which may be disposed on either face or side of the plate, that is, facing either the material to be heated or facing the interior of the heated air distribution plenum, is surrounded by a nozzle which is asymmetrical in terms of nozzle length. Each nozzle has a section 67 oriented towards the front of the heating space which is longer in length than a section 68 disposed opposite section 67. It will be apparent to those skilled in the art that section 68 may have zero length and, as such, is deemed to be within the scope of this invention.

As previously described, each blower provides air to one of the pairs of spaced apart heated air distribution plenums 30, 31 and 32, 33. As shown in FIG. 9, disposed between the 90 degree elbow 60 and the heated air distribution plenums is a diffusion transition 85 to enable distribution of the heated air across the entire width of the heated air distribution plenums. However, because of the short distance, typically about 12 inches, between the relatively narrow blower outlet and the relatively wide heated air distribution plenum, the wide angle of diffusion causes separation at the ends of the diffusion transition, thereby causing lower air velocities at the rear corners of the heating space. These spots of low air velocity are substantially eliminated by the disposition of guide vanes 90 within the diffusion transition 85, as shown in FIG. 9. In addition, guide vanes 90 improve the left to right baking uniformity, improve aerodynamics, reduce pressur drop and increase airflow and heat transfer coeeficients.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A heating apparatus comprising:
   a blower box;
   at least one heating section wall defining a heating space in fluid communication with said blower box, said heating space having a back side proximate said blower box and an opposite facing front side disposed distal from said blower box;
   a plurality of vertically spaced apart pairs of spaced apart first and second heated air distribution plenums disposed in said heating space, said spaced apart first and second heated air distribution plenums having a heated air inlet opening in fluid communication with said blower box and said spaced apart pairs forming a return air conduit therebetween extending between said back side and said front side of said heating space and having a return air outlet end in fluid communication with said blower box;
   each of said first and second heated air distribution plenums having a substantially planar heated air distribution plate facing a space between said first and second heated air distribution plenums and having a plurality of heated air outlet openings; and
   a heating surface suitable for supporting an object to be heated disposed between each said spaced apart first and second heated air distribution plenums.

2. A heating apparatus in accordance with claim 1, wherein said heating surface is a conveyor surface.

3. A heating apparatus in accordance with claim 1 further comprising a plurality of blowers disposed within said blower box, 50% of said blowers having a blower output in fluid communication with one of said spaced apart pairs of said first and second spaced apart heated air distribution plenums and a remaining 50% of said blowers having a blower output in fluid communication with another of said spaced apart pairs of spaced apart first and second heated air distribution plenums.

4. A heating apparatus in accordance with claim 3, wherein two said blowers are disposed within said blower box.

5. A heating apparatus in accordance with claim 4, wherein each of said blowers comprises a blower motor disposed outside of said blower box, each of said blowers comprising a blower shaft oriented parallel to a direction of flow of supply air into said spaced apart heated air distribution plenums.

6. A heating apparatus in accordance with claim 4, wherein said blowers are positioned within said blower box diagonally with respect to each other.

7. A heating apparatus in accordance with claim 4, wherein two 90° elbow transition sections are disposed within said blower box, providing said fluid communication between each said blower outlet and a corresponding pair of said first and second heated air distribution plenums.

8. A heating apparatus in accordance with claim 1, wherein each of said heated air distribution plenums has a vertically tapered shape with a widest portion of said tapered shape oriented toward said blower box.

9. A heating apparatus in accordance with claim 1, wherein at least a portion of said heated air outlet openings comprise a nozzle wall extending into said heated air distribution plenum, said nozzle wall having a shape whereby heated air flowing through said openings has a direction of flow substantially perpendicular to said heating surface.

10. A heating apparatus in accordance with claim 1, wherein at least a portion of said heated air outlet openings comprise a nozzle wall extending in a direction of said heating surface, said nozzle wall having a shape whereby heated air flowing through said openings has a direction of flow substantially perpendicular to said heating surface.

11. A heating apparatus in accordance with claim 9, wherein said nozzle wall is longer on a side of said heated air outlet opening distal from said blower box.

12. A heating apparatus in accordance with claim 10, wherein said nozzle wall is longer on a side of said heated air outlet opening distal from said blower box.

13. A heating apparatus in accordance with claim 7, wherein at least one turning vane is disposed in each of said 90° elbow transition sections.

14. A heating apparatus in accordance with claim 1 further comprising at least one burner tube disposed within an air plenum proximate said return air outlet end of said return air conduit.

15. A heating apparatus in accordance with claim 1 further comprising a return air duct disposed in each corner of said heated space extending from said front side to said back side and having a return air duct inlet opening in fluid communication with said heating space and a return air duct outlet opening in fluid communication with an air plenum.

16. A heating apparatus in accordance with claim 7 further comprising a diffuser section having a wide portion and a narrow portion disposed between said 90° elbow transition section and said heated air distribution plenums, said wide portion oriented toward said heated air distribution plenums and said narrow portion oriented toward said 90° elbow transition section.

17. A heating apparatus in accordance with claim 16, wherein at least one guide vane is disposed within said diffuser section.

18. A heating apparatus in accordance with claim 1 further comprising opposed return air conduit sidewalls extending between said spaced apart pairs of said spaced apart first and second heated air distribution plenums from said back side to said front side of said heating space, said ends of said sidewalls proximate said front side having a convex profile oriented toward an interior of said return air conduit.

19. A heating apparatus comprising:
at least one wall enclosing a blower box and forming at least one air inlet opening and at least two air outlet openings;
at least one heating section wall defining a heating space adjacent to and in fluid communication with said blower box;
two vertically spaced apart pairs of spaced apart heated air distribution plenums, said spaced apart pairs forming a return air conduit therebetween, said return air conduit having a return air outlet end in fluid communication with said at least one air inlet opening and said spaced apart heated air distribution plenums having a heated air inlet opening in fluid communication with said at least two air outlet openings;
a horizontal heating surface disposed between each pair of said spaced apart heated air distribution plenums; and
each of said heated air distribution plenums comprising a substantially horizontally disposed perforated heated air distribution plate facing said horizontal heating surface.

20. A heating apparatus in accordance with claim 19 further comprising at least one burner tube disposed within said blower box proximate said at least one air inlet opening.

21. A heating apparatus in accordance with claim 19, wherein said horizontal heating surface is a conveyor surface.

22. A heating apparatus in accordance with claim 19, wherein each of said heated air distribution plenums is vertically tapered whereby said narrow side is disposed distal from said blower box.

23. A heating apparatus in accordance with claim 19, wherein said perforated heated air distribution plates comprise a nozzle wall disposed around each perforation extending one of toward said heating surface and into an interior of said heated air distribution plenum.

24. A heating apparatus in accordance with claim 23, wherein said nozzle walls are asymmetrical in length with a longest length disposed on a side of said perforations distal from said blower box.

25. A heating apparatus in accordance with claim 19 further comprising two blowers disposed within said blower box, each of said blowers having a blower air inlet in fluid communication with said at least one air inlet opening and having a blower air outlet in fluid communication with each heated air distribution plenum of one of said pairs of spaced apart heated air distribution plenums.

26. A heating apparatus in accordance with claim 25, wherein each of said blowers comprises a blower motor disposed external to said blower box, said blower motor having a drive shaft extending parallel to a direction of flow of air into said heated air distribution plenums.

27. A heating apparatus in accordance with claim 25, wherein said blowers are positioned within said blower box diagonally with respect to each other.

28. A heating apparatus in accordance with claim 25, wherein a 90° elbow transition conduit is connected to each blower air outlet, thereby providing a fluid communication conduit between said blower air outlet and said heated air distribution plenums.

29. A heating apparatus in accordance with claim 28, wherein at least one turning vane is disposed within said 90° elbow transition conduit.

30. A heating apparatus in accordance with claim 28, further comprising a diffuser section having a wide portion and a narrow portion disposed between said 90° elbow transition conduit and said heated air distribution plenums, said wide portion oriented toward said heated air distribution plenums and said narrow portion oriented toward said 90° elbow transition conduit.

31. A heating apparatus in accordance with claim 30, wherein at least one guide vane is disposed within said diffuser section.

32. A heating apparatus in accordance with claim 19 further comprising opposed return air conduit sidewalls extending between said two spaced apart pairs of spaced apart heated air distribution plenums from a back side to a front side of said heating space, said ends of said sidewalls proximate said front side having a convex profile oriented toward an interior of said return air conduit.

* * * * *